April 22, 1924.
A. U. WALTER
SPRING LUBRICATOR COVER
Filed Sept. 3, 1921
1,491,216
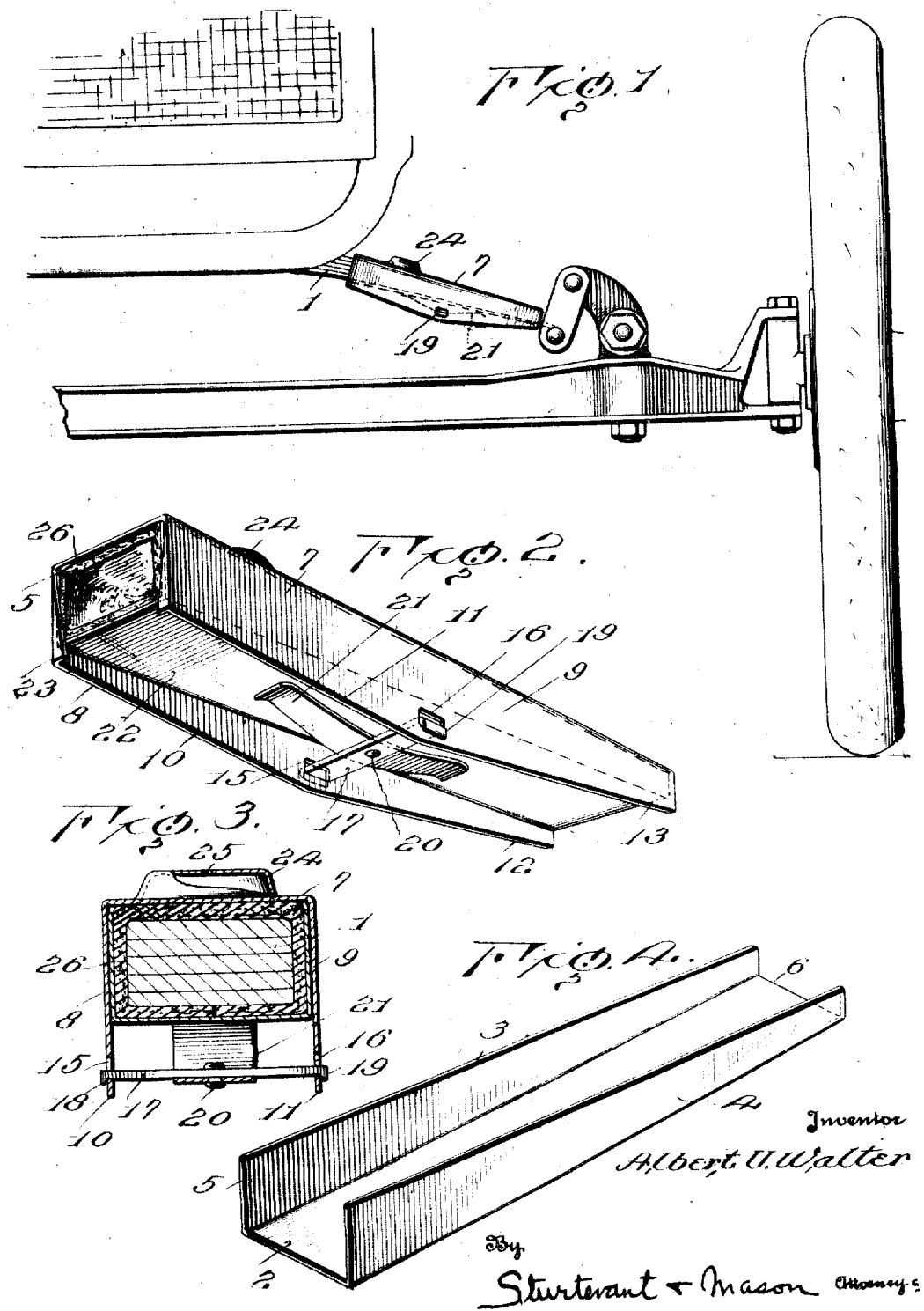
Inventor
Albert U. Walter
By
Sturtevant + Mason Attorneys Patented Apr. 22, 1924.

1,491,216

UNITED STATES PATENT OFFICE.

ALBERT U. WALTER, OF BALTIMORE, MARYLAND.

SPRING-LUBRICATOR COVER.

Application filed September 3, 1921. Serial No. 498,340.

*To all whom it may concern:*

Be it known that I, ALBERT U. WALTER, a citizen of the United States, residing at Baltimore, State of Maryland, have invented certain new and useful Improvements in Spring-Lubricator Covers, of which the following is a description, reference being had to the accompanying drawing and to the figures of reference marked thereon.

This invention relates to improvements in metal casings for the laminated springs of vehicles, and more particularly to a metal casing extending longitudinally of the spring and serving as a protective casing and a lubricating means for the spring.

One of the objects of this invention is to provide such a casing in which the members thereof enclosing the spring have limited relative movement to permit the free normal bending of the spring, but which parts will act to check any undue separation of the leaves, thus acting as a rebound clip.

Another object of this invention is to provide a casing of the described character in which the casing parts are held assembled, enclosing the spring by a simple means which permits the parts to be quickly and easily put together.

Yet another feature of this invention resides in forming the casing of two telescoping sheaths, and providing means for resiliently holding the sheaths assembled so as to permit the spring to flex normally, but to act as a positive stop to check undue separation of the leaves of the spring.

A further object resides in constructing the member of substantially rigid sheet metal stampings, and in the manner of forming the oil retaining cup as an integral part of the upper casing member.

These and other objects will in part be obvious and will in part be hereinafter more fully disclosed.

Referring to the accompanying drawings:—

Figure 1 is a front view of an automobile showing the improved casing in attached position;

Fig. 2 is a perspective view of the complete casing;

Fig. 3 is a sectional view of the same as assembled, and

Fig. 4 is a perspective view of the bottom casing member.

In the drawings, I have shown my improvement as applied to a Ford car, and one end of one spring 1 only is shown. It will be understood, however, that the device may be readily shaped so as to be applied to other types of cars. The device consists of a sheet metal bottom casing or sheath 2 which is substantially U-shaped in cross section. Said casing or sheath 2 has open ends and upstanding vertical walls 3 and 4 which taper from the end 5 to the end 6 to correspond to the tapering thickness of the laminated spring 1. Associated with this bottom casing or sheath 2 is a cover or upper casing member 7 which is likewise open at its ends and provided with downwardly extending vertical side wall 8 and 9. The bottom edges 10 and 11 of the side walls 8 and 9 respectively, extend below the bottom portion 22 of the casing or sheath 2. The side walls 8 and 9 are provided with apertures 15 and 16, respectively, which as shown are rectangular. Extending through the apertures 15 and 16 is a bar 17, the ends of which are provided with lips 18 and 19, respectively, which engage the outer face of the side walls 8 and 9 and prevent the side walls from spreading. These lips also prevent the bar 17 from endwise movement. Rigidly secured to the bar 17 is a leaf spring 21. Said spring is preferably riveted to the bar as indicated at 20. Said leaf spring bears against the bottom 22 of the casing or sheath 2 and yieldingly forces the same upwardly into the cover portion 7. The slots or apertures 15 and 16 are slightly larger than the cross section of the bar 17, which together with the yielding sides permits the bar to be readily inserted in the apertures or removed therefrom.

In order to prevent relative endwise movement of the upper and lower casings 2 and 7, the upper casing 7 has the metal of one end turned in slightly as indicated at 23 to provide a positive stop against which the end of the inner casing member 2 abuts. This inturned portion on the upper casing 7 is at the left-hand end thereof as viewed in Fig. 1.

At any desired point, preferably near the inner end thereof, the sheet metal of the cover of casing member 2 is drawn to form an integral oil cup 24 which is perforated at 25 for the introduction of the lubricating oil. This oil cup projects outwardly. Located within the telescoping casings is an absorbent pad 26. This pad is preferably shaped so that when laid about the springs, 110 the ends thereof throughout substantially abut and the spring is substantially encircled by the pad.

In assembling the device, the rebound clip is removed from the spring, as my telescoping members take the place of the rebound clip and perform the function thereof. The absorbent pad 26 is then laid about the spring and is preferably temporarily secured to the spring by means of a string or the like, after which the pad is soaked with lubricating oil. The bottom casing 2 is next placed under the spring and over the pad and the top cover placed over the spring and over the pad so as to enclose the pad, the lateral walls 8 and 9 of the cover or upper casing 7 lying outside of the lateral walls 3 and 4 of the bottom casing 2. The casings are then forced together and the locking bar 17 carrying the spring 21 is placed in the apertures 15 and 16. The leaf spring bears against the bottom 22 of the lower casing or sheath 2, and yieldingly holds the two casing members in contact with the pad and the pad in contact with the spring. The spring 21 permits the sections or casings to move relative to each other to accommodate the normal flexing or bending of the laminated spring. However, if the flexing caused by rebound is undue, the bottom casing 2 will be forced directly against the bar 17 which forms a positive stop to check further tendency of the leaves of the spring to separate. In other words, the spring, bar 17, and rigid metal casings function as a rebound clip to prevent the spring from breaking.

When it is desired to oil the springs, it is not necessary to take the casings apart. The oil is inserted through the port 25 in the oil cup 24.

It will be noted that the device is simply and quickly assembled on a spring. It protects the spring from dirt and keeps it soaked in oil while presenting a neat attractive casing for the spring. The casings are firmly held in position so as to avoid all rattling and the device can be oiled without removing from the springs.

While I have described the leaf spring as supported by the bar carried by the side members of the cover or upper casing member, it will be obvious that from certain aspects of the invention, other means may be provided for supporting said spring, as for example, a V-shaped clip may embrace the top cover in place of the depending sides, said clip having slots or other suitable means for supporting the bar carrying the spring. It will also be understood that a plurality of springs and supporting bars may be used if found desirable. The essential feature consists in the providing of a spring support which will cause the two sections to yieldingly move relative to each other, which support is so disposed as to cooperate with the casing members to perform the function of the ordinary rebound clip.

It will be obvious that minor changes in the details of construction and the arrangement of the parts may be made without departing from the spirit of the invention as set forth in the appended claims.

Having thus described the invention, what I claim as new and desire to secure by Letters Patent, is:—

1. A device of the class described comprising in combination with a leaf spring, an open-ended trough-shaped casing surrounding the bottom and sides of said spring, an open-ended trough-shaped cover covering the top of said spring with its lateral walls enclosing the side walls of said bottom casing, said lateral walls having oppositely disposed apertures therethrough, and a locking bar passing transversely through said apertures and provided with a spring pressing upwardly against the bottom of said bottom casing.

2. In a device of the class described in combination with a leaf spring, a pair of trough-shaped casings enclosing said spring, one of said casings telescoping within the other, and means for holding said casing in assembled position, said means permitting said casings to have a limited movement to accommodate the normal action of said springs, said means restricting further relative movement of said casings and constituting a rebound clip for said spring.

3. In a device of the class described, in combination with a leaf spring, a trough-shaped member forming a casing for the bottom and sides of said spring, a trough-shaped cover fitting over the top and sides of said casing, whereby to completely enclose said spring, and means permitting said casing and cover to have a yielding relative vertical play for a distance corresponding to the normal rebound range of the leaf spring and to thereafter prevent further vertical play whereby to constitute a rebound clip for the leaf spring.

4. In a device of the class described, in combination with a leaf spring, a pair of trough-shaped casings enclosing said spring, one of said members telescoping within the other, and spring means for holding the casings in contact with the leaf spring, said spring means including devices to limit the telescoping movement of said casings whereby said casings act as a rebound clip.

In testimony whereof, I affix my signature.

ALBERT U. WALTER.